INVENTOR
LORENZ A. HITTEL
HOMER W. MILLER
BY
[signature]
ATTORNEY

ELECTRONIC DATA PROCESSING SYSTEM WITH TIME SHARING OF MEMORY

Filed April 14, 1965 4 Sheets-Sheet

INVENTOR
LORENZ A. HITTEL
HOMER W. MILLER
BY
[signature]
ATTORNEY

April 9, 1968 L. A. HITTEL ETAL 3,377,621

ELECTRONIC DATA PROCESSING SYSTEM WITH TIME SHARING OF MEMORY

Filed April 14, 1965 4 Sheets-Sheet 3

INVENTOR
LORENZ A. HITTEL
HOMER W. MILLER
BY

Arnold E. Renner

ATTORNEY

ELECTRONIC DATA PROCESSING SYSTEM WITH TIME SHARING OF MEMORY

Filed April 14, 1965 4 Sheets-Sheet 4

INVENTOR
LORENZ A. HITTEL
HOMER W. MILLER

ATTORNEY

United States Patent Office 3,377,621

Patented Apr. 9, 1968

3,377,621

ELECTRONIC DATA PROCESSING SYSTEM WITH TIME SHARING OF MEMORY

Lorenz A. Hittel and Homer W. Miller, Phoenix, Ariz., assignors to General Electric Company, a corporation of New York Filed Apr. 14, 1965, Ser. No. 448,052
22 Claims. (Cl. 340—172.5)

ABSTRACT OF THE DISCLOSURE

An electronic data processing system employing a memory and a plurality of units for input/output functions with respect to the memory further includes means for directing the accessing of the memory by the units.

Figure 1A:
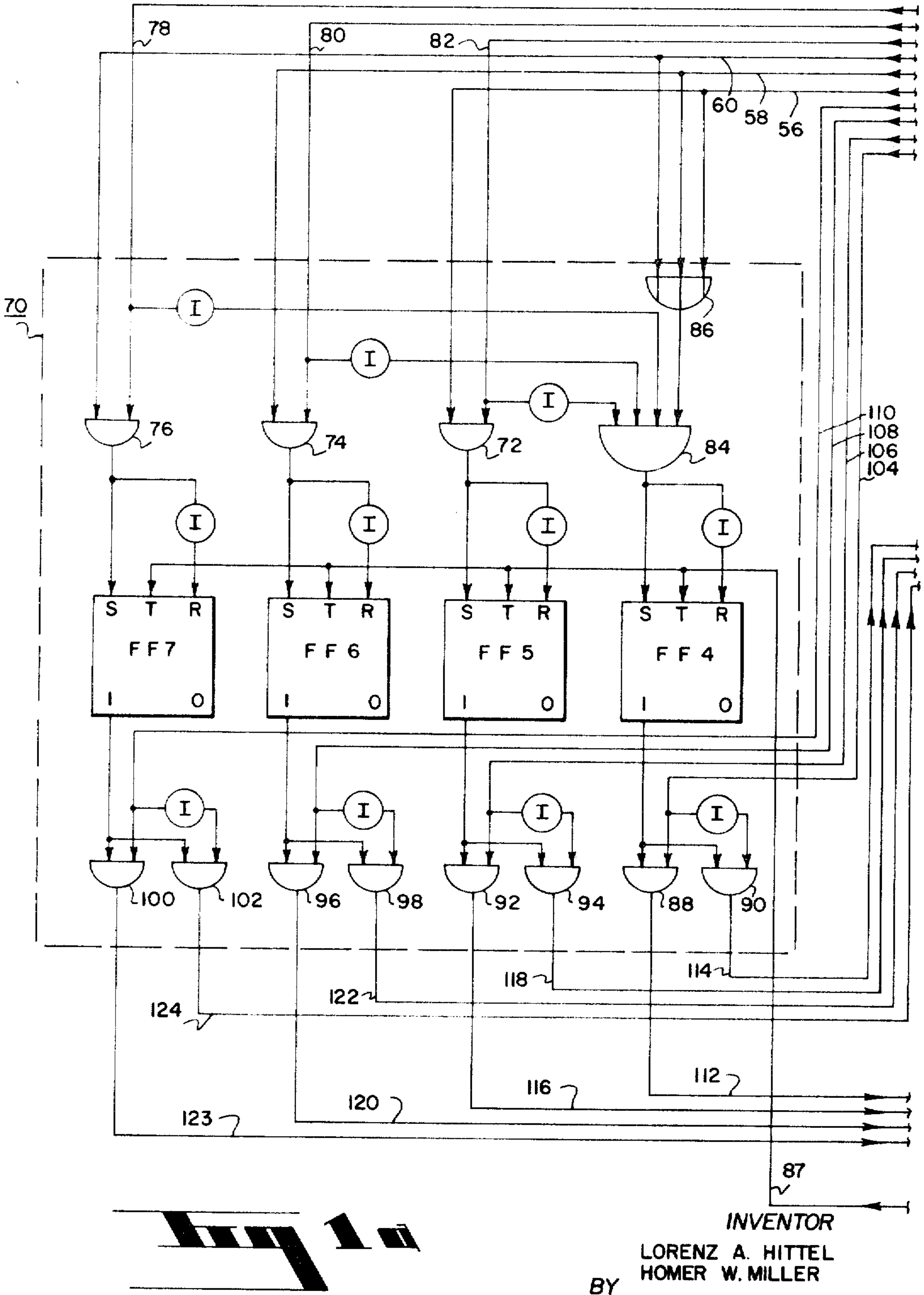

The present invention relates generally to electronic data processing systems and more particularly to an electronic data processing system in which successive accesses to the memory are shared, on a time or phaseal relationship, among the several other elements or components of the system.

The customary electronic data processing system, or computer system as it is more commonly called, includes three basic components or portions. These are the central processor which essentially governs and directs the entire operation of the computer system and also performs the various computations and operations of the system; one or more peripheral devices which, while performing a variety of functions, may generally be described as providing the input/output functions of the computer (that is, for supplying or receiving information to or from the computer system); and a memory which stores information, both data and program, and which must be accessible by the central processor and the peripheral devices. While the memory is often considered a portion of the central processor, it will best serve the present purposes to consider it as a separate entity and to realize that information flow with respect to the memory, whether it be information in the form of statistical data or in the form of program control, is both into the memory from the central processor and the several peripheral devices and out of the memory to the same components.

In most modern day computer systems, all of the components; i.e., the central processor, the memory and the peripheral devices, perform their several functions in the same period or length of time. That is, in this given length of time, a unit of data, subsequently called a word, may be transferred either to or from the memory to or from the central processor or the peripheral devices. Additionally, the various functions performed by the the central processor and the peripheral devices are also normally carried on within one of these specific time periods. This specific period of time is called by several names including word time, memory cycle time, and others; but for the purposes of this application it shall be referred to as a word time. Regardless of what it may be called, however, the important factor which bears reiteration is the fact that, in the customary computer system, all of the components, the central processor, the memory, and the peripheral devices are designed to operate and do in fact operate on the basis of this single word time. It should, however, be pointed out that only a small portion of the total word time is actually involved in the transfer of data between the memory and the several other components. This small amount of time, which may be considered the critical period, occurs at approximately the center of each of the respective word times. The rest of the word time is taken up with the preparing of the several components for making or accepting this transfer or for other related purposes.

A factor warranting further clarification at this time concerns the statement just made pertaining to the operational speed of the peripheral devices. Peripheral devices usually employ some form of mechanical action imposing more stringent limitations upon the speed of these devices than are present with respect to the central processor or the memory which are essentially electronic devices capable of operational speeds far exceeding those of mechanical devices. Therefore, in order to enable the mechanically limited functions of the peripheral devices to communicate properly with the memory and the central processor, controller units are normally interposed between the memory-central processor part of the computer system and the mechanical functions of the system's peripheral devices. The controller unit acts as an intermediary which accepts information at a first rate of speed and passes this information on at a second rate of speed. The controller unit forms a part of the peripheral device and is specifically designed to match the speed of the mechanical portion of that device with the word time of the memory of the system. In the subsequent discussion, therefore, the term peripheral device is intended to include the appropriate controller unit.

Inasmuch as the prevailing practice has been to match the speed of the peripheral devices with that of the central processor and the memory, it is seen that, as the speed of the central processor and the memory is increased as has been the practice to date, a new set of peripheral devices must be designed to properly mate or cooperate with these faster central processing units. Several factors make this an undesirable requirement in certain cases. For example, the normal computer user upon initial acquisition of a computer system has limited application for the system. Thus, because the cost of a system and its speed, and hence its processing capabilities, are closely interrelated, the user will normally procure a fairly small system which may also be one which is relatively slow. However, as the user's business grows and his acquaintance with the system increases, he begins to find more and more application for the system and soon finds himself in the position of no longer having processing capabilities sufficient to meet his demand. In such a situation, essentially two courses of action have been available to him. He may either purchase a second system similar to the one he had, thus essentially doubling his capability and his cost, or he may decide to replace his present system with a faster word time system which is capable of processing a greater amount of data in a given time. The first of the above two solutions may be unsatisfactory because the user may not have, or not be willing to devote, the physical plant required to house the double system. This may be especially true in that, while his capability has essentially doubled, his rate of processing data has not substantially changed. The second alternative, that of acquiring a larger and faster system, is one which is necessarily very expensive to the user for several reasons. In this situation, it may well be that the user has adequate peripheral facilities or is only in need of a limited number of additional peripheral facilities. Additionally, the user's programs and other "software" facilities may not be readily adaptable to the higher speed machine thus necessitating the expense of rewriting these programs. If the latter approach is chosen, however, the user has no alternative but to purchase the requisite peripheral devices which are adapted to the faster speed machine even though his present peripheral facilities are adequate for his needs.

While it is true that a fast memory can operate with a slower peripheral device by allowing the former to await the latter's completion of an operation, this does not represent an efficient utilization of the faster speed memory and, as such, negates a portion of the advantages which the memory of higher speed will provide. In order, therefore, to efficiently utilize the increased speed cababilities of the electronic portions a computer system, it is desirable in certain instances to be able to properly mate slower peripheral devices with the faster system components in a manner which does not require the memory to await the peripheral devices' completion of operation.

The present invention alleviates a portion of the aforementioned difficulties associated with the user's demand for increased processing facilities by providing a system which allows the computer user to intermix memories which operate at one speed or word time with peripheral devices operable at other speeds or word times; e.g., peripheral devices which are initially designed to operate at a slower word time.

It is, therefore, an object of the present invention to provide an improved data processing system embodying means for mating various components operable at different rates of speed.

A further object is to provide an improved electronic data processing system embodying means for mating a memory operable at a first word time with peripheral devices operable at a second word time.

Another object is to provide an electronic data processing system embodying a memory operable at a first word time and peripheral devices operable at a second word time of longer duration than said first word time.

Still another object of the present invention is to provide an electronic data processing system employing a memory operable at a first word time and peripheral devices operable at a second word time which is substantially an integral multiple, greater than one, of said first word time.

Still another object is to provide an improved electronic data processing system embodying means for mating a memory and a central processor operable at a first word time to one or more peripheral devices operable at a second word time of approximately three times the first word time duration.

Another object of this invention is to provide an improved electronic data processing system in which successive word times of the memory are divided into a plurality of phases and in which each of these phases is allocated for permitting particular components of the system access to the memory.

Briefly, and in accordance with the present invention, the above objects are realized by providing a memory operable at a first word time. The system may also include a central processor and one or more peripheral devices operable at this first word time but further includes at least one peripheral device which is operable at a second word time. Preferably, although it does not constitute a necessity, the first and second word times bear a relationship one to the other such that the second word time is an integral multiple, greater than one, of the first word time. In the embodiment to be explained in detail, this integral multiple is three. The system of the present invention further includes means for dividing successive first word times into a plurality of phases and these phases are then allocated to particular components within the total system. In further explanation, each of the first word time phases is allocated to a particular component or components and during each repetition of this phase, the particular component(s) to which that phase is allocated is permitted access to the memory unit.

Figure 1B:
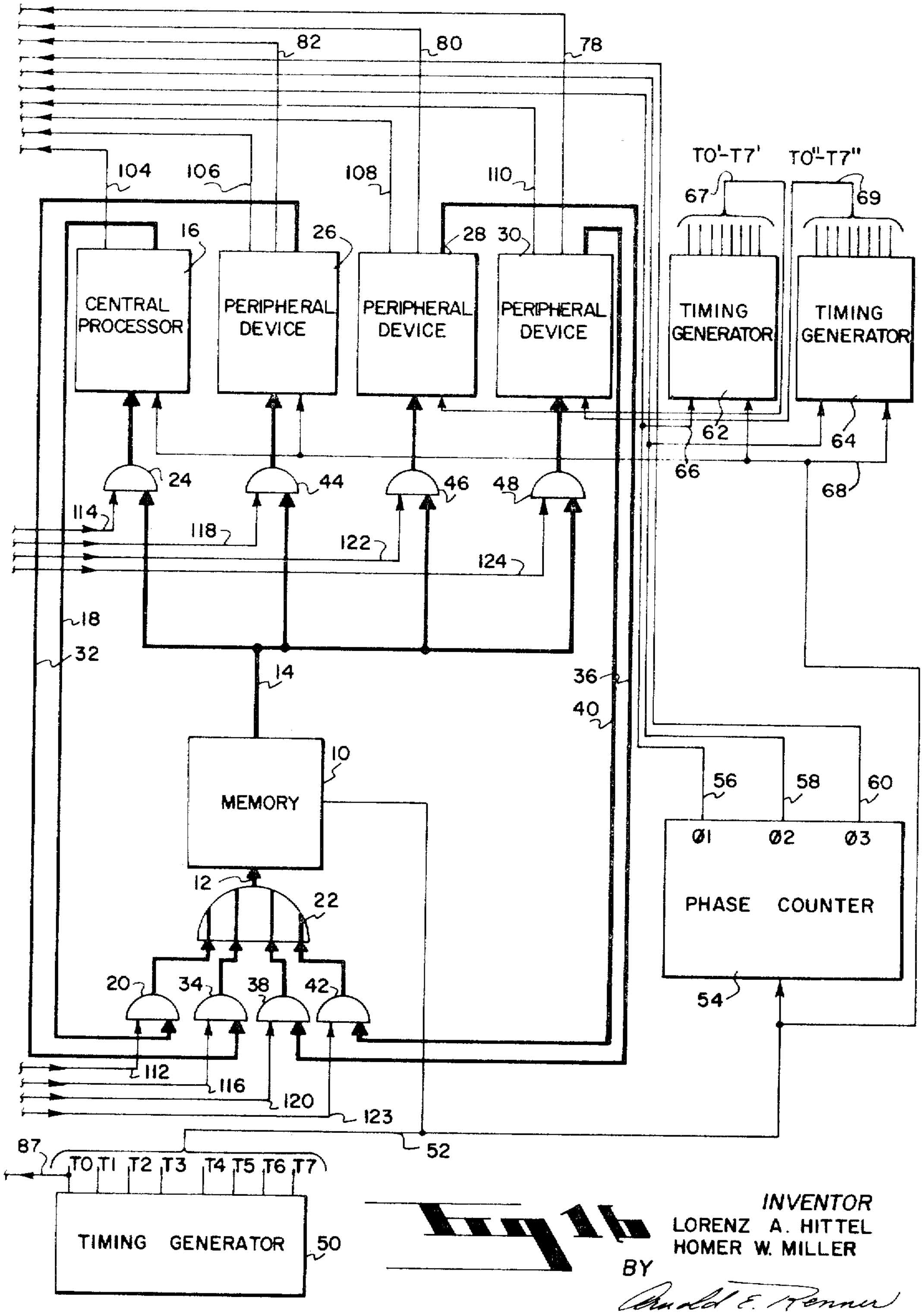
Figure 3:
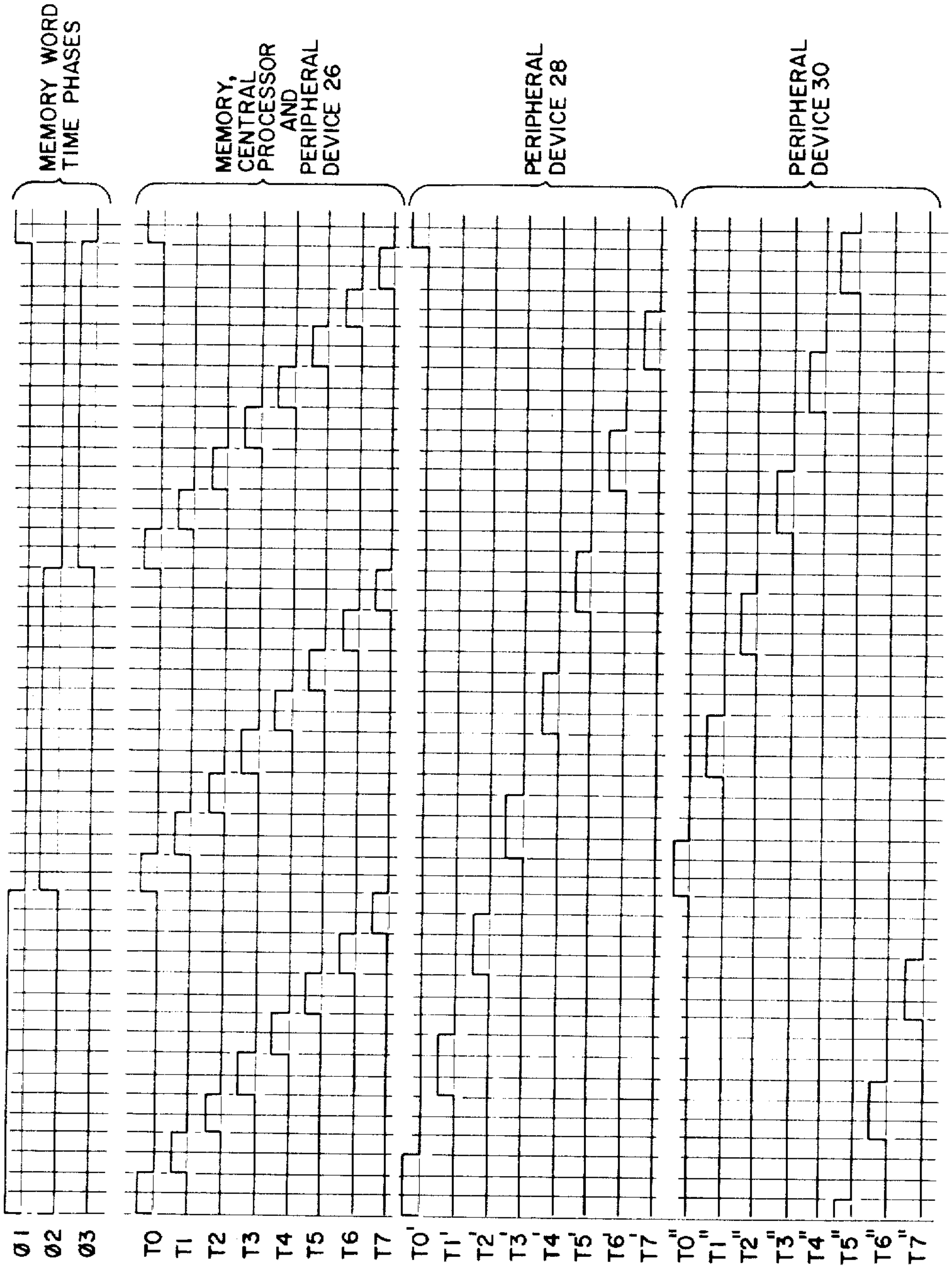
Figure 3:
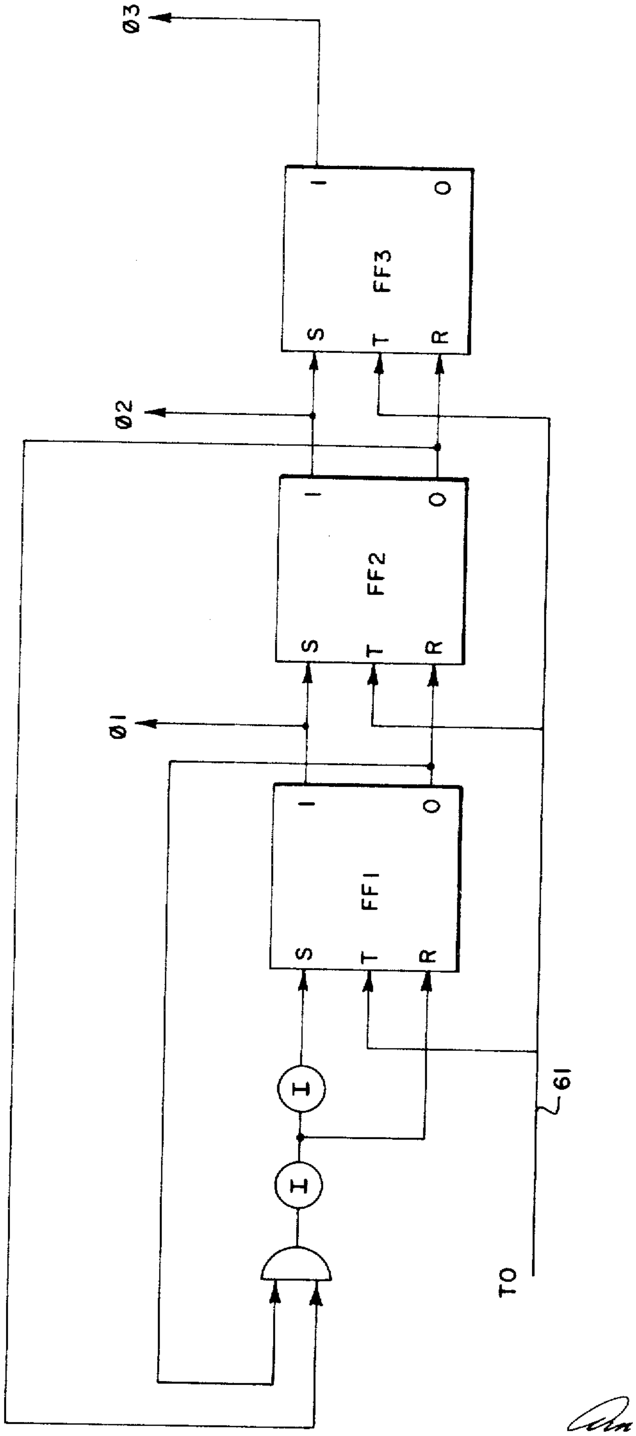

Further objects and advantages of the present invention will become apparent as the following description proceeds and features of novelty which characterize the invention will be pointed out in particularity in the claims annexed to and forming a part of this specification. For a better understanding of the present invention, however, reference is made to the accompanying drawings in which:

FIGS. 1*a* and 1*b* taken together constitute a schematic representation of an electronic data processing system embodying the present invention;

FIG. 2 is a timing diagram illustrating the time relationship of various timing signals utilized in the implementation of the present invention; and, FIG. 3 is a schematic representation illustrating one possible means of dividing the word times of the memory into a plurality of phases or groups.

Before proceeding with the detailed description of the drawings, it is believed desirable to define several terms utilized therein. In the present system, as in any system, the various electrical signals generated and utilized will be of some particular magnitude or magnitudes. The values of these signals do not, however, form a part of the present invention and these values may, in fact, vary from system to system. In the ensuing discussion, therefore, these signals will be described merely as being of a "high level" or of a "low level." The term AND-gate as herein used designates a multiple input logic element whose output is at a high level only when all of its inputs are at a high level. An OR-gate is a multiple input logic element whose output is at a high level when any one of its inputs is at a high level and an inverter is a single input logic element whose output is at a high level when its input is at a low level and vice versa. A flip-flop is a bistable device whose output is a function of the last input to the device. The flip-flops utilized in the implementation of the present invention are of the type which permit the changing of the output state only at predetermined times. These flip-flops include three input terminals; a set or S terminal, a reset or R terminal, and a trigger or T terminal, and two output terminals; a 1-terminal and a 0-terminal. If high level signals are applied simultaneously to the S and T terminals, the 1 output terminal of the flip-flop is at a high level and the 0 output terminal is at the low level. Conversely, if high level signals are applied simultaneously to the R and T terminals of the flip-flop, the 1 output terminal of the flip-flop is at a low level and the 0 output terminal is at the high level. A further designation utilized in the drawings of the present specification provides that the lines of greater width indicate data paths while the narrower lines indicate control signal paths. It is further noted that the lines designating data paths, although shown singularly, represent a bus for the parallel transfer of data. The particular number of lines constituting this bus is not important to the present invention and will vary according to the dictates of the particular system. In a like manner, certain of the lines representing control signal paths also represent a bus as will become apparent as this description proceeds.

Since the present invention pertains to a data processing system, the description thereof can become very complex. However, it is believed unnecessary to describe all the details of the system in order to adequately explain the present invention. Therefore, most of the detail that is well known in the art will be eliminated or omitted from this description.

Proceeding now with the detailed description of the present invention, reference is made to the accompanying drawings. With specific reference to FIGS. 1*a* and 1*b*, there is shown a memory 10 which may be of any suitable type; for example, a core memory into or from which information is read by the coincident current method. The memory 10 serves as the storage element for the present system and, as is customary in the art, is designed to operate within a specified period of time which in the present description has been defined as a first word time. During this first word time, a data transfer may be made between memory and either a central processor 16 or one of a plurality of peripheral devices 26, 28, or 30 as is indicated by the heavier data lines and as will be explained in more detail later. Data or information is inserted into the memory via a data bus 12 while data or information is taken from the memory and supplied to the other components of the system via a data bus 14.

The central processor 16 may be of any suitable type and performs all of the functions which are common to central processors. For example, the central processor 16 performs such functions as controlling the over-all operation of the entire system as well as performing other functions such as arithmetic operations. The central processor 16 is in communication with the memory 10 and is capable of transmitting information to the memory through data bus 18, AND-gate 20, OR-gate 22 and the data bus 12. The central processor 16 receives data from the memory through the data bus 14, the extension of which forms one of two inputs to an AND-gate 24. The output of AND-gate 24 forms the data input into the central processor 16. Because in actual practice, the memory is normally very closely associated with the central processor, in the present embodiment of the invention as is being described, the central processor 16 is defined as operable at the same word time as is the memory 10. As will become obvious as the present description proceeds, however, this does not form a necessary criteria of the present invention.

The system shown in FIGS. 1*a* and 1*b* also includes three peripheral devices 26, 28 and 30. It is to be expressly understood that those blocks designated 26, 28 and 30 and identified as peripheral devices are not meant to be construed as a single peripheral device, such as printer or tape handlers, but do in fact represent the function achieved or performed by one or more of these devices. In further explanation, the term peripheral device as is used in the specification designates not only a single device and its necessary controlling element but also a plurality of such devices which may be connected into the system by a means such as the selecting means described in United States Patent No. 3,239,819, issued Mar. 8, 1966, "Data Processing System Including Priority Features for Plural Peripheral Devices," by David W. Masters, and assigned to the assignee of the present invention. In the embodiment of the invention now being described, peripheral device 26 is designed to operate at the same speed as the central processor 16 and the memory 10 while peripheral devices 28 and 30 are each of a slower nature whose word time is of a different duration. In the present illustration, the word time of the peripheral devices 28 and 30 is approximately three times that of the memory 10.

As was previously stated, a great portion of the details forming the system of the present invention has been omitted for the sake of clarity and thus the several control lines which may interconnect the central processor and the various peripheral devices 26, 28 and 30 have been omitted. The transfer of information between these several components has been limited to a transfer through the memory 10 by suitable buses. Thus, as illustrated in FIGS. 1*a* and 1*b*, the peripheral devices 26, 28 and 30 are in communication with the memory 10 in a manner similar to that utilized with respect to the central processor. That is, peripheral device 26 has a data input to the memory via bus 32, AND-gate 34, OR-gate 22 and the bus 12. Peripheral device 28 has a data input into memory via bus 36, AND-gate 38, OR-gate 22 and bus 12; and in a similar manner, peripheral device 30 has a data input into memory via bus 40, AND-gate 42, OR-gate 22 and the bus 12. The output bus 14 of the memory is applied simultaneously to the central processor 16 and each of the peripheral devices 26, 28 and 30 and it is seen that this bus is connected to one input of each of three AND-gates 24, 44, 46 and 48. The outputs of these last mentioned AND-gates are respectively connected to the central processor 16, the peripheral device 26, peripheral device 28 and the peripheral device 30 to form the data inputs to these components.

As in any system of the class to which the present invention belongs, there is provided a means for effecting the speed and timing of the entire system. In the present case, this timing is provided by a timing generator 50 which may be of any suitable type well known in the art. Timing generator 50 provides eight equally spaced pulses designated T0–T7 as is best illustrated in FIG. 2. The pulses T0–T7 are high level signals. The repetition rate of the pulses T0–T7 is at a rate identical to the word time of the memory and the central processor. These eight pulses, T0–T7, are brought from the timing generator on eight distinct lines and are applied by way of a suitable bus 52 to the memory 10, the central processor 16 and peripheral device 26 to provide suitable timing for these components.

Previous reference has been made to the phasing of successive word times of the memory to permit access, in a prescribed order, of the several components to the memory 10. The element for providing this phasing in the present embodiment is a phase counter represented by block 54 in FIG. 1*b*. Phase counter 54 has three output lines 56, 58 and 60 connected respectively to three output terminals designated $\phi1$, $\phi2$ and $\phi3$. The output signals of the phase counter 54 appear sequentially on the lines 56, 58 and 60 and designate the phase condition of the system. These signals are respectively designated as $\phi1$, $\phi2$ and $\phi3$ and their relationship to one another and to the T0–T7 pulses of the timing generator 50 is shown in FIG. 2. The phase counter 54 switches its output sequentially from line to line in a recirculating manner with each repetition of the T0–T7 pulses. While a variety of well-known means could be utilized for producing the three phase outputs, one method of achieving this desired result is illustrated in FIG. 3. FIGURE 3 shows a conventional recirculating shift register employing three interconnected flip-flops FF1, FF2 and FF3. By an input line 61, each T0 pulse from the timing generator 50 is applied to the T terminals of the three flip-flops, thus providing that a high level signal results sequentially at outputs $\phi1$, $\phi2$ and $\phi3$. The signal at each of these outputs extends for the period between successive T0 pulses as is best illustrated in FIG. 2.

In accordance with the stated objects, and as has been previously noted, peripheral devices 28 and 30 operate at a word time which differs from that of the memory and the central processor. In the specific example here being described, the word time of the peripheral devices 28 and 30 is approximately three times that of the memory 10. As was the case with the other components, some means must provide the timing of the peripheral devices 28 and 30. To this end, there are provided two additional timing generators 62 and 64 associated respectively with the peripheral devices 28 and 30. Timing generator 62 provides eight equally spaced high level pulses, designated as T0′–T7′, as are illustrated in FIG. 2. To insure that the timing generator 62 initiates its pulses at the proper time, there is provided a connection with the $\phi1$ output of the phase counter 54 by means of lines 56 and 66 (FIG. 1*b*). This pulse assures that the T0′ pulse coincides with the beginning of the $\phi1$ pulse and hence the T0 pulse. In a similar manner, the timing generator 64 is connected by lines 58 and 68 to the $\phi2$ output of the phase counter 54 to thereby assure that its pulses, designated T0″–T7″ (FIG. 2), are initiated with the beginning of $\phi2$ pulse. It is further necessary that the two timing generators 62 and 64 operate in synchronism with the basic timing of the system supplied by timing generator 50. Thus, there is provided an input to each of these generators from line 52, the eight line bus of the timing generator 50. The output pulses of the two timing generators 62 and 64 are connected respectively by respective lines 67 and 69 to the peripheral devices 28 and 30 to provide the timing for these devices.

It was previously stated that only a small portion of the total word time is actually involved in the transfer of data between the memory and the other components. An inspection of FIG. 2 reveals that the leading edge of each T4 pulse coincides, in time with the approximate midpoint of each of the phase pulses; $\phi 1$, $\phi 2$ and $\phi 3$. It is also seen that the leading edge of the T4′ pulse occurs at the approximate midpoint of the $\phi 2$ pulse and the leading edge of the T4″ pulse occurs at the approximate midpoint of the $\phi 3$ pulse. Thus, by assuring that the data transfers are made at these prescribed times, the necessary transfers may be properly accomplished within each of the respective memory word times.

A memory access control unit 70 cooperates with the phase counter 54 to determine the sequential accessing of the memory 10 by the central processor 16 and the several peripheral devices 26, 28 and 30. Unit 70 includes four flip-flops FF4, FF5, FF6 and FF7, associated respectively, with the central processor 16 and the peripheral devices 26, 28 and 30. Flip-flops FF5, FF6 and FF7 are similarly connected; each having an AND-gate (gates 72, 74 and 76 in that order) connected to its respective S terminal. The three outputs of the phase counter 54 are connected respectively to form one of the inputs to each of the AND-gates 72, 74 and 76. Thus the $\phi 1$ output is connected by line 56 to gate 72, the $\phi 2$ output is connected by line 58 to gate 74 and the $\phi 3$ output is connected by line 60 to gate 76. The other input to each of these three AND-gates is a signal from its respective peripheral device requesting access to memory for either the read or write operations. More explicitly, the second input to AND-gate 76 is connected by a line 78 to the peripheral device 30 while the second input to AND-gate 74 is connected by a line 80 to peripheral device 28. The second input to AND-gate 72 is connected by line 82 to peripheral device 26. Thus, it is seen that if during the presence of the $\phi 1$ signal, peripheral device 26 desires access to memory, flip-flop FF5 will be placed into its set state. Similarly, during the presence of the $\phi 2$ signal, peripheral device 28 may set flip-flop FF6 into its set state and during the presence of the $\phi 3$ signal, peripheral device 30 may set flip-flop FF7 into its set state.

Connected to the S terminal of flip-flop FF4 is a four-input AND-gate 84 having three of its inputs connected through inverters I to the three memory request lines (lines 82, 80 and 78) of the peripheral devices 26, 28 and 30. The fourth input to AND-gate 84 is the output of a three-input OR-gate 86 whose inputs are connected one to each of the phase lines 56, 58 and 60. It is further noted that the outputs of each of the AND-gates 72, 74, 76 and 84 are connected through an inverter I to the reset terminal of its respective flip-flop in order to provide for the resetting of these devices in a manner well known in the art. The final item concerning the input side of the unit 70 is the connection of each of the T terminals of the four flip-flops to the T0 pulse line of the timing generator 50 by means of a conductor 87.

From the thus far described portion of the system, the essential operation of this system may be understood if it is assumed, as is the case, that the outputs of the flip-flops FF4–FF7 represent the means for granting access to the memory 10. In the operation of the system, timing generator 50 initiates a T0 pulse which places the phase counter 54 in the condition providing a high level pulse on the $\phi 1$ output line 56. The T0 pulse is also applied at this time to the T terminals of each of the flip-flops FF4–FF7. If at this time the peripheral device 26 desires access to memory, a high level signal is supplied by that peripheral device to the line 82, thus enabling AND-gate 72 to thereby apply a high level signal to the S terminal of flip-flop FF5. This places this flip-flop into its set state thus providing a high level signal at its 1 output terminal indicating that peripheral device 26 desires access to the memory 10. With this occurrence, none of the other flip-flops within unit 70 can be placed in the set state inasmuch as the phase signals are not present at AND-gates 74 and 76, and AND-gate 84 is disabled by the inversion of the signal on line 82. During $\phi 2$ of the phase counter 54, flip-flop FF6 may be placed into its set state by the application of the $\phi 2$ signal on line 58 and a memory request signal on line 80 from peripheral device 28, thus placing flip-flop FF6 into the set state indicating a memory request for peripheral device 28. In a similar manner, AND-gate 76 is enabled to place flip-flop FF7 into the set state during the $\phi 3$ signal by the presence of a high level signal on line 78, thus indicating a memory access request by peripheral device 30. It is thus seen that the three phases of the memory word times are allocated respectively to the peripheral devices 26, 28 and 30.

In the system illustrated, the central processor 16 can gain access to memory during any of the three phases not being utilized by the respective peripheral device. The central processor 16 does not actually request access to the memory but instead takes access during any of the three phases in which the memory is not being otherwise utilized. It is seen that at any T0 time, lacking a high signal request from any of the peripheral devices on the lines 78, 80 or 82, high level signals resulting from the several inverters I will be applied to the AND-gate 84. As the fourth terminal of the AND-gate 84 is connected by OR-gate 86 to the three phase lines 56, 58 and 60, a high level signal is applied from this source to the AND-gate 84 during all of the phases and thus AND-gate 84 is enabled to place flip-flop FF4 into its set state indicating that the central processor is to have access to memory. It is, of course, obvious that the OR-gate 86 and its associated connections could be omitted from the present system with the same end results and it is here included only as a means to emphasize the fact that the central processor can gain access to the memory at any time when the memory is not otherwise being utilized.

Inasmuch as the outputs of the several flip-flops FF4–FF7 designate which of the components is to have access to the memory 10, the sole remaining determination to be made is whether the operation to be performed is to be a write into or read from memory operation. This determination is made on the output side of the flip-flops FF4–FF7. The output of each of these flip-flops forms one input to each of a pair of two input AND-gates. With specific reference to FIG. 1*a*, it is seen that the output of flip-flop FF4 provides an input to each of two AND-gates 88 and 90, flip-flop FF5 provides an input to AND-gates 92 and 94, flip-flop FF6 provides an input to AND-gates 96 and 98 and the output of flip-flop FF7 forms an input to AND-gates 100 and 102. The other input to each of these AND-gates, hereinafter called the read/write input, is connected to the component of the system with which the respective flip-flop is associated. That is, the central processor is connected to the other inputs of AND-gates 88 and 90 by a read/write line 104 while the peripheral device 26 is connected to AND-gates 92 and 94 by a read/write line 106. Peripheral device 28 is connected to AND-gates 96 and 98 by a read/write line 108 and the peripheral device 30 is connected to AND-gates 100 and 102 by a read/write line 110. For purposes of this illustration, it is assumed that if the particular component desires to write into memory that the read/write line will have placed thereon a high level signal while if it desires to read from memory, the signal will be a low level signal. It is further noted that an inverter I is connected between the respective read/write designation inputs of each of the pairs of AND-gates associated with each of the flip-flops FF4–FF7 so that one of these gates is enabled according to whether there is a high or low level signal on the read/write designation lines.

From the foregoing, it is seen that the operation of the system is as follows. Assuming the system is in its $\phi 1$ condition and that peripheral device 26 desires access to the memory 10 for the purpose of writing information thereinto, flip-flop FF5 is placed into its set state upon the occurrence of the T0 pulse and to thus provide a high level signal at its output. A high level signal designating a write into memory operation is provided on the line 106 thus enabling AND-gate 92, the output of which is applied via a conductor 116 as an input to AND-gate 34. The second input to AND-gate 34, as has been previously stated, is the data bus 32. With the application of these signals to AND-gate 34, information may be written into the memory 10 through the OR-gate 22 from peripheral device 26. Similarly, if the operation requested by peripheral device 26 were a read from memory operation, AND-gate 94 would be enabled and the output therefrom applied via a conductor 118 to one input of AND-gate 44. The second input to AND-gate 44 is connected to the output data bus 14 of the memory 10, thus permitting information to be read from the memory to the peripheral device 26. During the $\phi 2$ pulse, a memory request from peripheral device 28 places flip-flop FF6 into its set state and either AND-gate 96 or 98 is enabled in accordance with the status of line 108. The output state of the AND-gates 96 and 98 determines which of the gates 38 or 46 is to be enabled to thus perform either the write or read operation. The identical type of operation exists for peripheral device 30 during the period of the $\phi 3$ pulse.

In the case of the central processor 16, the access to the memory 10 is performed in substantially the identical manner as was described above except that, as was previously discussed, the central processor takes access to the memory during any of the three phases when the memory 10 is not being utilized by one of the peripheral devices.

Thus, it is seen that there has been shown and described a data processing system which enables the mating of multiple devices which are essentially designed for operations at different rates of speed.

While one particular embodiment of this invention has been described, numerous modifications to the system are possible without departing from the spirit and scope of the present invention. For example, the system shows a memory, a central processor and one peripheral device operable at a first speed and two peripheral devices operable at a second speed. Were the system to warrant such, the first peripheral device could be operable at the same speed as the other two peripheral devices by providing a third timing generator, similar to generators 62 and 64, for that first peripheral device and connecting it in a manner similar to that shown with respect to peripheral devices 28 and 30. It would also be entirely possible to provide a central processor operating at a different speed than the memory; e.g. at the speed of the peripheral devices or even at a third speed. In a similar manner, more than three peripheral devices could be utilized in the system embodying the present invention by expanding the number of phases. For example, a four peripheral device system could be designed utilizing identical concepts by dividing the successive memory word times into four phases. In a like manner, by dividing the memory word times into four phases, the central processor 16 could be given its own period during which it could access the memory with essentially the same system as has here been shown and described. And, employing the identical concepts as have been described, it is entirely possible to employ components operating at more than two different speeds. For example, utilizing the concepts of the present invention, a system could be readily designed which employs a memory operating at a first speed, a central processor operating at a second speed and a plurality of peripheral devices operating at several different speeds. Thus, it is seen that the present invention provides an extremely versatile system which is limited only by the practical limits of the number of devices which may be tied to a single memory.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are, therefore, intended to cover and embrace any such modifications, within the limits only of the true spirit and scope of the invention.

What is claimed is:

1. An electronic data processing system comprising: a memory operable at a first word time; at least one additional system component operable at a second word time of different duration than that of said first word time, the occurrence of said first and second word times having a fixed time relationship with respect to one another; and means for permitting access to said memory by said system component at predetermined recurring intervals including means for dividing successive first word times into a plurality of phases, and means for allocating one of said phases to said system component.

2. An electronic data processing system comprising: a memory operable at a first word time; at least one additional system component operable at a second word time of longer duration than that of said first word time, the occurrence of said first and second word times being synchronized with respect to one another; and means for directing access to said memory by said system component including means for dividing successive first word times into a plurality of phases, and means for allocating one of said phases to said system component.

3. An electronic data processing system comprising: a memory operable at a first word time; a plurality of peripheral devices operable at a second word time of different duration than that of said first word time, the occurrence of said first and second word times being synchronized with respect to one another; and means for permitting said peripheral devices to access said memory only during predetermined first word times including means for dividing successive first word times into a plurality of phases, and means for allocating selected ones of said phases to said peripheral devices.

4. An electronic data processing system comprising: a memory operable at a first word time; a central processor; at least one peripheral device operable at a second word time of greater duration than that of said first memory word time; means for maintaining a prescribed time relationship between said first and second word times; and means for permitting said peripheral device to access said memory during prescribed ones of said first word times including means for dividing successive first word times into a plurality of phases, and means for allocating selected ones of said phases to said peripheral device for accessing said memory.

5. An electronic data processing system comprising: a memory operable at a first word time; a central processor; a plurality of devices operable at a second word time of greater duration than that of said first memory word time; means for maintaining a prescribed time relationship between said first and second word times; and means for permitting said peripheral devices to access said memory during prescribed ones of said first word times including means for dividing successive first word times into a plurality of phases, and means for allocating selected ones of said phases to said peripheral devices for accessing said memory.

6. An electronic data processing system comprising: a memory and at least one other system component operable at a first word time; at least one additional system component operable at a second word time of different duration than that of said first word time, the occurrence of said first and second word times having a fixed time relationship with respect to one another; and means for permitting access to said memory by each of said system components including means for dividing successive first word times into a plurality of phases, and means for allocating said plurality of phases between said first and second mentioned system components.

7. An electronic data processing system comprising: a memory and at least one other system component operable at a first word time; at least one additional system component operable at a second word time of longer duration than that of said first word time, the occurrence of said first and second word times being synchronized with respect to one another; and means for directing access to said memory by each of said system components including means for dividing successive first word times into a plurality of phases, and means for allocating said plurality of phases between said first and second mentioned system components.

8. An electronic data processing system comprising: a memory and a central processor operable at a first word time; at least one peripheral device operable at a second word time of different duration than that of said first word time, the occurrence of said first and second word times being synchronized with respect to one another; and means for permitting said peripheral device to access said memory only during predetermined first word times including means for dividing successive first word times into a plurality of phases, and means for allocating selected ones of said phases to said peripheral device.

9. An electronic data processing system comprising: a memory and a central processor operable at a first word time; at least one peripheral device operable at a second word time of greater duration than that of said first memory word time; means for maintaining a prescribed time relationship between said first and second word times; and means for permitting said peripheral device to access said memory during prescribed ones of said first word times including means for dividing successive first word times into a plurality of phases, and means for allocating selected ones of said phases to said peripheral device for accessing said memory.

10. An electronic data processing system comprising: a central processor operable at a first word time; a memory operable at said first word time; at least one peripheral device operable at a second word time of greater duration than that of said first memory word time; the occurrence of said first and second word times having a fixed time relationship to each other; and means for determining during which of said first word times said peripheral device may access said memory, said latter means comprising means for dividing successive first word times into a given number of recurring phases, and means for allocating one of said recurring phases to said peripheral device during which said peripheral device may access said memory.

11. An electronic data processing system comprising: a central processor and a memory each operable at a first word time; first and second peripheral devices each operable at a second word time of different duration than said first word time; means connecting said memory with said central processor and each of said peripheral devices for enabling access thereof to said memory; and means for directing access to said memory by said central processor and said peripheral devices including means for dividing successive first word times into a plurality of phases, and means for allocating said plurality of phases among said central processor and said first and second peripheral devices.

12. An electronic data processing system comprising: a central processor and a memory each operable at a first word time; first and second peripheral devices each operable at a second word time of longer duration than said first word time; means connecting said memory with said central processor and each of said peripheral devices for enabling access thereof to said memory; and means for directing access to said memory by said central processor and said peripheral devices including means for dividing successive first word times into a plurality of phases, and means for allocating said plurality of phases among said central processor and said first and second peripheral devices.

13. An electronic data processing system comprising: a central processor and a memory each operable at a first word time; first and second peripheral devices each operable at a second word time of longer duration than said first word time; and means connecting said memory with said central processor and each of said peripheral devices for enabling the access of said central processor and said peripheral devices to said memory during prescribed ones of said first word times, said means comprising: means for dividing successive first word times into a plurality of phases, and means for allocating selected ones of said phases to said peripheral devices.

14. An electronic data processing system comprising: a central processor and a memory each operable at a first word time; first and second peripheral devices each operable at a second word time of longer duration than said first word time; and means connecting said memory with said central processor and each of said peripheral devices for enabling the access of said central processor and said peripheral devices to said memory during prescribed ones of said first word times, said means comprising; means for dividing successive first word times into a plurality of phases, and means for permitting said first and second peripheral devices to access said memory only during selected ones of said phases.

15. An electronic data processing system comprising: a central processor and a memory operable at a first word time of predetermined duration; a first timing means for generating a first plurality of pulses repeating during each of said first word times, said first plurality of pulses governing the operation of said central processor and said memory; at least one peripheral device operable at a second word time of different duration than that of said first word time; a second timing means for generating a second plurality of pulses repeating during each of said second word times, said second plurality of pulses governing the operation of said peripheral device and having a fixed time relationship with said first plurality of pulses; means for dividing said first word times into a plurality of phases; and means for allocating selected ones of said phases for the accessing of said memory by said peripheral device.

16. An electronic data processing system comprising: a central processor and a memory operable at a first word time of predetermined duration; a first timing means for generating a first plurality of pulses repeating during each of said first word times, said first plurality of pulses governing the operation of said central processor and said memory; at least one peripheral device operable at a second word time of greater duration than that of said first word time; a second timing means for generating a second plurality of pulses repeating during each of said second word times, said second plurality of pulses governing the operation of said peripheral device and synchronized in time by said first plurality of pulses; means for dividing said first word times into a given number of phases; and means for allocating selected ones of said phases for the accessing of said memory by said peripheral device.

17. An electronic data processing system comprising: a central processor, a memory and a first peripheral device all operable at a word time of a first time duration; second and third peripheral devices each operable at a second word time of a duration differing from that of said first word time; means for connecting said central processor and each of said peripheral devices to said memory; means for dividing successive first word times into three phases; means for allocating separate ones of said phases to said first, second and third peripheral devices; and mens for permitting each of said peripheral devices access to said memory during its respective phase.

18. An electronic data processing system comprising: a central processor, a memory and a first peripheral device all operable at a word time of a first time duration;

additional peripheral devices each operable at a second word time of a duration differing from that of said first word time; means for connecting said central processor and each of said peripheral devices to said memory; means for dividing successive first word times into a number of phases equal to the number of said peripheral devices; means for allocating separate ones of said phases to each of said peripheral devices; and means for permitting each of said peripheral devices access to said memory during its respective phase.

19. An electronic data processing system comprising: a central processor, a memory and a first peripheral device all operable at a word time of a first time duration; second and third peripheral devices each operable at a second word time of a duration longer than that of said first word time; means for connecting said central processor and each of said peripheral devices to said memory; a first timing means for generating a first plurality of pulses during each of said first word times for governing the operation of said central processor, said memory and said first peripheral device; a second timing means for generating a second plurality of pulses within the time duration each of said second word times; a third timing means for generating a third plurality of pulses within the time duration of each of said second word times, said second and third pluralities of pulses governing respectively said second and third peripheral devices; and means for directing the accessing of said memory by said central processor and said peripheral devices, said means comprising means for dividing successive first word times into three phases; means for allocating separate ones of said phases to said first, second and third peripheral devices; and means for permitting each of said peripheral devices access to said memory during its respective phase.

20. An electronic data processing system comprising: a central processor, a memory and a first peripheral device all operable at a first word time of given duration; second and third peripheral devices each operable at a second word time approximately three times the duration of said first word time; means for connecting said central processor and each of said peripheral devices to said memory; a first timing means for generating a first plurality of pulses during the time period of each of said first word times for governing the operation of said central processor, said memory and said first peripheral device; a second timing means for generating a second plurality of pulses during the time period of each of said second word times; a third timing means for generating a third plurality of pulses, displaced in time from said second plurality of pulses, and recurring during the time period of each of said second word times, said second and third pluralities of pulses governing respectively said second and third peripheral devices; means for dividing successive first word times into three phases; means for allocating separate ones of said phases to said first, second and third peripheral devices; and means for permitting each of said peripheral devices access to said memory during its respective phase and for permitting said central processor to access said memory during any of said phases when said memory is not being accessed by one of said peripheral devices.

21. An electronic data processing system comprising: a central processor, a memory and a first peripheral device all operable at a word time of a first time duration; second and third peripheral devices each operable at a second word time approximately three times the duration of said first word time; means for connecting said central processor and each of said peripheral devices to said memory; and means for controlling the accessing of said memory by said peripheral devices, said means comprising means for dividing successive first word times into three phases; means for allocating separate ones of said phases to said first, second and third peripheral devices, and means for permitting each of said peripheral devices access to said memory during its respective phase.

22. An electronic data processing system comprising: a central processor, a memory and a first peripheral device all operable at a word time of a first time duration; second and third peripheral devices each operable at a second word time whose duration is approximately an integral multiple, greater than one, of the duration of said first word time; means for connecting said central processor and each of said peripheral devices to said memory; and means for controlling the accessing of said memory by said central processor and said peripheral devices, said means comprising means for dividing successive first word times into three phases, means for allocating separate ones of said phases to said first, second and third peripheral devices, and means for permitting each of said peripheral devices access to said memory during its respective phase and for permitting said central processor to access said memory during any of said phases when said memory is not being accessed by one of said peripheral devices.

References Cited

UNITED STATES PATENTS

| | | | |
|---|---|---|---|
| 3,171,099 | 2/1965 | Foulkes | 340—172.5 |
| 3,202,969 | 8/1965 | Dunwell et al. | 340—172.5 |
| 3,231,863 | 1/1966 | Ulfesparre | 340—172.5 |
| 3,249,924 | 5/1966 | Furlong | 340—172.5 |

PAUL J. HENON, *Primary Examiner.*

ROBERT C. BAILEY, *Examiner.*

R. RICKERT, *Assistant Examiner.*